US012705916B2

(12) United States Patent
Ghosh et al.

(10) Patent No.: US 12,705,916 B2
(45) Date of Patent: Aug. 11, 2026

(54) HYBRID KEY VALUE DOCUMENT EXTRACTION

(71) Applicant: INTUIT INC., Mountain View, CA (US)

(72) Inventors: Mithun Ghosh, Bangalore (IN); Sourav Prosad, Kolkata (IN); Arkadeep Banerjee, Kolkata (IN); Aditya Soni, Howrah (IN)

(73) Assignee: INTUIT INC., Moutain View, CA (US)

( * ) Notice: Subject to any disclaimer, the term of this patent is extended or adjusted under 35 U.S.C. 154(b) by 335 days.

(21) Appl. No.: 18/410,819

(22) Filed: Jan. 11, 2024

(65) Prior Publication Data

US 2025/0182514 A1 Jun. 5, 2025

(30) Foreign Application Priority Data

Nov. 30, 2023 (IN) ............................ 202341081350

(51) Int. Cl.
*G06V 30/413* (2022.01)
*G06F 40/205* (2020.01)
(Continued)

(52) U.S. Cl.
CPC .......... *G06V 30/413* (2022.01); *G06F 40/205* (2020.01); *G06V 30/19093* (2022.01); *G06V 30/414* (2022.01)

(58) Field of Classification Search
CPC ........... G06V 30/413; G06V 30/19093; G06V 30/414; G06F 40/205
See application file for complete search history.

(56) References Cited

U.S. PATENT DOCUMENTS

| | | | | |
|---|---|---|---|---|
| 6,233,575 | B1 * | 5/2001 | Agrawal | G06F 16/355 |
| 12,205,395 | B1 * | 1/2025 | Lam | G06V 30/414 |

OTHER PUBLICATIONS

Stein, Roger A., Patricia A. Jaques, and Joao F. Valiati. “An Analysis of Hierarchical Text Classification Using Word Embeddings.” arXiv preprint arXiv:1809.01771 (2018). (Year: 2018).*

(Continued)

*Primary Examiner* — Stephen R Koziol
*Assistant Examiner* — Joshua Chen
(74) *Attorney, Agent, or Firm* — Lathrop GPM LLP

(57) ABSTRACT

The method may include generating, by a vector embedding model, a vector embedding of multiple terms in an input document to obtain multiple term encodings. The method may also include generating, by a cascading classifier model, a classification of the input document. Generating the classification includes iteratively: traversing a directed acyclic graph ordering multiple class groups, and while traversing the directed acyclic graph, classifying the input document into a first class of a current class group of the class groups using the term encodings, where classifying the input document into the first class uses at least one second class of at least one parent class group of the class groups, and where the classification includes the first class and the at least one second class. The method may furthermore include obtaining a set of target fields corresponding to the classification. The method may in addition include extracting a set of values from the input document matching the set of target fields.

20 Claims, 9 Drawing Sheets

(51) Int. Cl.
*G06V 30/19* (2022.01)
*G06V 30/414* (2022.01)

(56) References Cited

OTHER PUBLICATIONS

Polettini, Nicola, Diego Sona, and Paolo Avesani. “A relational cascade correlation for structured outputs.” 2008 IEEE International Joint Conference on Neural Networks (IEEE World Congress on Computational Intelligence). IEEE, 2008. (Year: 2008).*

* cited by examiner

START

TRAVERSE TO A NEXT NODE OF A DIRECTED ACYCLIC GRAPH ORDERING CLASS GROUPS 302

CLASSIFY, USING ANY PARENT CLASSES IDENTIFIED BY THE DIRECTED ACYCLIC GRAPH AND TERM EMBEDDINGS, THE INPUT DOCUMENT INTO A FIRST CLASS OF A CURRENT CLASS GROUP OF THE CURRENT NODE USING THE TERM EMBEDDINGS 304

ANOTHER NODE IN THE DIRECTED ACYCLIC GRAPH? 306

YES

NO

END

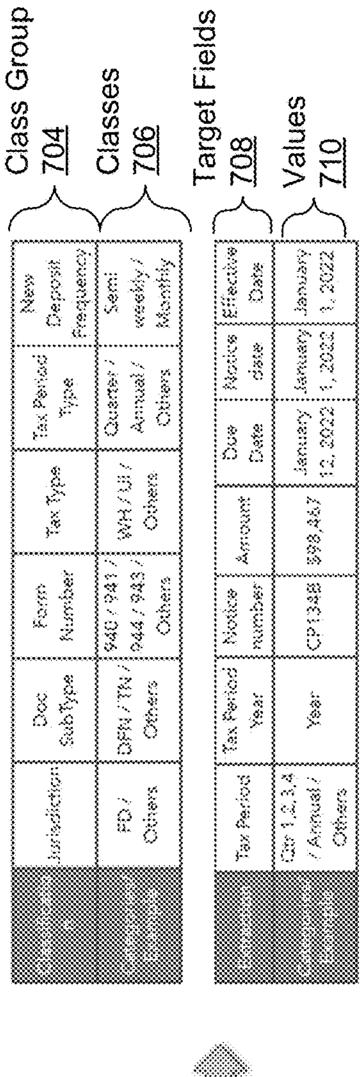
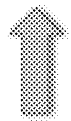
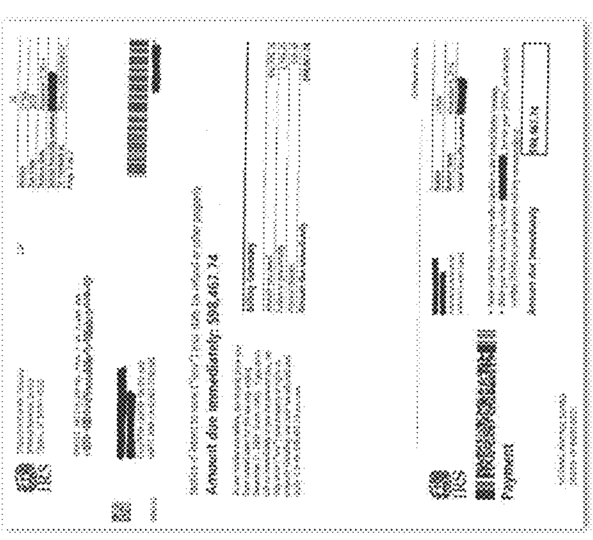
FIG. 7

902

Dear Taxpayer,

Each calendar year the Department of Revenue Services (DRS) classifies employers as weekly remitters, monthly remitters, or quarterly remitters.

For the calendar year 2022, DRS has classified you as a monthly Wage withholding remitter because you reported more than $2,000 but no more than $10,000 in Connecticut income tax withholding from the wages of your employees for the period beginning 07/01/2020 and ending 06/30/2021.

If you use a payroll company, it is your responsibility to notify them of your new payment frequency.

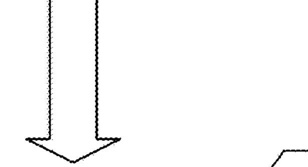

904

Context: …employees for the period beginning 07/01/2020 and ending 06/30/2021
Question: What is the start date of the period ?
Answer: 07/01/2020

*FIG. 9*

HYBRID KEY VALUE DOCUMENT EXTRACTION

CROSS REFERENCE TO RELATED APPLICATIONS

This application claims benefit under 35 U.S.C. § 119(a) to Indian Provisional Patent Application No. 202341081350, filed on Nov. 30, 2023. Indian Provisional Patent Application No. 202341081350 is incorporated by reference in its entirety.

BACKGROUND

Automatic data extraction is complex because computers do not "read" documents in a similar manner to humans. Namely, computers, which operate on encodings, cannot simply look at a document and gather the pertinent information. Data extraction is even more complex when the document type of the document is unknown. For example, in the financial sector, whether a document is a bill, an invoice, a receipt, or a donation acknowledgement letter has implications on the data that can be extracted from the document. Further, end users may have difficulty identifying types of documents. For example, the end user may receive a notice that the end user is unable to identify the type or which information is relevant. Without knowing the type of document, the layout of information in the document, whether freeform or tabular, along with the data that is available to extract from the document is unknown. Thus, a problem exists in identifying the type of document and then extracting the content that is available.

SUMMARY

In general, in one aspect, one or more embodiments relate a method. For example, the method may include generating, by a vector embedding model, a vector embedding of multiple terms in an input document to obtain multiple term encodings. The method may also include generating, by a cascading classifier model, a classification of the input document. Generating the classification includes iteratively: traversing a directed acyclic graph ordering multiple class groups, and while traversing the directed acyclic graph, classifying the input document into a first class of a current class group of the class groups using the term encodings, where classifying the input document into the first class uses at least one second class of at least one parent class group of the class groups, and where the classification includes the first class and the at least one second class. The method may furthermore include obtaining a set of target fields corresponding to the classification. The method may in addition include extracting a set of values from the input document matching the set of target fields.

In general, in one aspect, one or more embodiments relate a system. For example, system may include one or more computer processors. System may also include storage having instructions for causing the one or more computer processors to perform operations. The operations may include generating, by a vector embedding model, a vector embedding of multiple terms in an input document to obtain multiple term encodings, and generating, by a cascading classifier model, a classification of the input document. Generating the classification includes iteratively: traversing a directed acyclic graph ordering multiple class groups, and while traversing the directed acyclic graph, classifying the input document into a first class of a current class group of the class groups using the term encodings, where classifying the input document into the first class uses at least one second class of at least one parent class group of the class groups, and where the classification includes the first class and the at least one second class. The operations may furthermore include obtaining a set of target fields corresponding to the classification. The operations may in addition include extracting a set of values from the input document matching the set of target fields.

In general, in one aspect, one or more embodiments relate a method. For example, the method may include classifying multiple training documents according to a first class group of multiple class groups to generate a first estimated set of classes for the training documents. The method may also include classifying, using the first estimated set of classes, the training documents according to a second class group of the class groups to generate a second estimated set of classes for the training documents. The method may furthermore include classifying, using the first estimated set of classes, the training documents according to a second class group of the class groups to generate a third estimated set of classes for the training documents. The method may in addition include comparing the second estimated set of classes to a labeled set of classes for the second class group to generate a first accuracy level. The method may moreover include comparing the third estimated set of classes to the labeled set of classes for the second class group to generate a second accuracy level. The method may also include adding the second class group to a directed acyclic graph as one of a sibling node and a child node of the first class group based on whether the first accuracy level is bigger than the second accuracy level.

Other aspects of the invention will be apparent from the following description and the appended claims.

BRIEF DESCRIPTION OF DRAWINGS

FIG. 7 shows an example of classification and extraction in accordance with one or more embodiments.

FIG. 9 shows an example of freeform extraction in accordance with one or more embodiments.

Like elements in the various figures are denoted by like reference numerals for consistency.

DETAILED DESCRIPTION

In general, embodiments are directed to document classification and corresponding key value extraction using a hybrid multiphase approach. The classification of an input document dictates the target fields that should be extracted from the document. Thus, in a classification phase, the classification of the input document is performed and, in the extraction phase, the target fields corresponding to the classification are extracted.

In the classification phase, an input document is classified according to multiple class groups. Each class group has a set of classes belonging to the class group. For each class group of at least a subset of the class groups, the input document is classified to determine the class in the class group to which the input document belongs. The classification of the input document into a class some of the class groups may help classify the input document into another class of a different class groups. Thus, one or more embodiments perform a cascading classification using a directed acyclic graph. The directed acyclic graph orders the class groups, and accordingly, the classification of the input document according to the class groups. The parent child relationship in the directed acyclic graph dictates which classes are used as a feature to classify the input document into another class group. Sibling relationships in the directed acyclic graph indicate that the class groups are independent and are not used as a feature. The result of the classification phase is a classification of the input document. The classification includes multiple classes having a class for each of the class groups.

The extraction phase handles both tabular and freeform extraction when the layout of the input document is unknown. For tabular extraction, the text description of the values may be in any position with respect to the values themselves including to the right of the values. Thus, one or more embodiments address the challenge of computers processing data right to left by using projections that are tied to predefined locations on respective bounding boxes. Specifically, when a text description is identified that matches a target field, a predefined point on the bounding box having the text description is identified. Then, a projection is created from the predefined point and rotated around the predefined point to obtain a set of bounding boxes. The set of bounding boxes are filtered based on various criteria, and a bounding box having the value is selected. Freeform extraction may be performed by detecting text related to a target field and generating context and a question asking the value of the target field. The context and question are sent to a language model that uses the context to answer the question by responding with the value for the target field. The result of the processing above is a system that handles extraction from various types of documents when the type of document is unknown beforehand.

Figure 1:
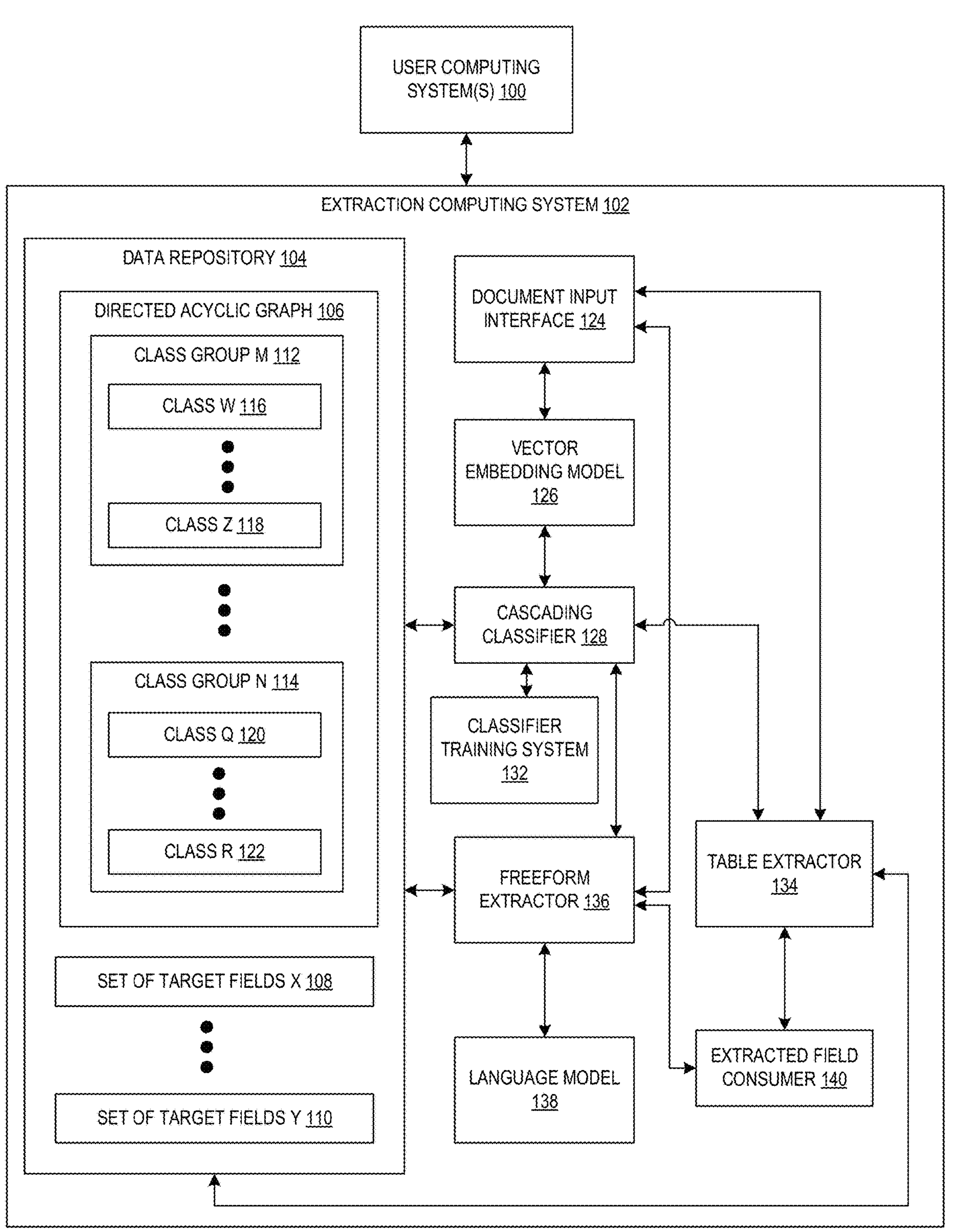
FIG. 1 shows a diagram of a system in accordance with one or more embodiments.

FIG. 1 shows a diagram of a system in accordance with one or more embodiments. As shown in FIG. 1, one or more user computing system(s) (100) are connected to an extraction computing system (102). The user computing system(s) (100) and the extraction computing system (102) may be implemented as or on the computing system discussed below with reference to FIG. 10A and FIG. 10B. The user computing system is a computing system of an end user. The user computing system (100) is configured to transmit or otherwise provide documents to the extraction computing system (102). Multiple user computing systems (100) may provide documents to the extraction computing system (102). For example, the extraction computing system (102) may be a server that directly or indirectly communicates with the user computing system(s) (100).

The extraction computing system (102) is configured to extract field value pairs from an input document. An input document is a document provided to the extraction computing system. The input document is a natural language text document in which natural language text may be visually presented. The natural language text may be in an image file format. In the image file format, the computer encoding of content in the document encodes the location of colors of pixels rather than character or word encoding. For example, the input document may be a scanned version of the input document.

In one or more embodiments, the original document includes a character encoding. However, the characters in the document may be unassociated with what the characters represent. For example, numbers may be unassociated with that which the numbers represent. Similarly, words or letters may be unassociated with the information represented by the words or numbers.

In some embodiments, the input document is a financial notice. The financial notice may be any document that relates financial information. Some examples of the financial notice include an internal revenue service notice, a financial form, a detailed invoice, a statement of account, or other notice. The financial document may include text that may indicate financial values and information, names of business entities, date, address, codes and symbols, etc.

The input document may provide information in virtually any layout. For example, the input document may include tabular data and/or freeform text. Tabular data is data that is in a table in the input document. A table has a collection of cells, whereby each cell is a single block of the table. There are various different orientations, and layouts of data in a table that may be used. For example, in a table, field identifiers describing the type of data in another cell may be in various other cells of the table. For example, a cell having a field identifier describing a type of data in the other cell may be in the left cell, right cell, top cell, or bottom cell with respect to the other cell of the table. One or more embodiments handle the nonuniform layouts of tables. Freeform text is text that is not in a table. For example, freeform text may be in sentence and paragraph form, in a bulleted list, or in another such form. One or more embodiments also perform extraction from the freeform text.

The extraction computing system (102) includes a data repository (104) connected to various other components of the extraction computing system (102). The data repository (104) is any type of storage unit and/or device (e.g., a file system, database, data structure, or any other storage mechanism) for storing data. Further, the data repository (104) may include multiple different, potentially heterogeneous, storage units and/or devices.

The data repository (104) is a directed acyclic graph (106). A directed acyclic graph (106) is a graph having nodes, the nodes link in a defined order to other nodes without forming a cycle. Nodes may be in parent child relationship or sibling relationship. Parent child relationship corresponds to the definition used in the art of data structures and includes ancestor relationship. Sibling relationships also correspond to the standard definition used in the art. In the parent child relationship, the parent node is directly or indirectly (e.g., through another parent node) connected to a child node such that the parent node must be processed before the child node. In the sibling relationship, two sibling nodes are not in the same path as each other. As such, either sibling node may be executed before the other sibling node.

The directed acyclic graph (106) defines an ordering of the class groups (e.g., class group M (112), class group N (114)). A class group (e.g., class group M (112), class group N (114)) defines a domain or type of characteristic by which documents are classified. Each class group has a corresponding node in the directed acyclic graph. In one or more embodiments, a node has at most a single corresponding class group. Additional nodes may be in the directed acyclic graph without departing from the scope of the invention. Each class group (e.g., class group M (112), class group N (114)) has multiple classes (e.g., class W (116), class Z (118), class Q (120), class R (122)). Each class (e.g., class W (116), class Z (118), class Q (120), class R (122)) is the attribute or characteristic of the document within the corresponding class group (e.g., class group M (112), class group N (114)). Namely, the class defines a particular type of the input document with respect to the class group. For example, for the class group of jurisdiction, the classes may be "Federal", "State", "California", "Washington DC", "Colorado", "Jackson Parish", etc. As another example, for the class group of "Year", the classes may be particular years. Although not specifically shown in FIG. 1, the class group may have a corresponding class group identifier that is a unique identifier of the class group. The directed acyclic graph (106) may store the class group identifiers in the nodes to order the class groups. Further, each class within a class group may have a corresponding class identifier. When an input document is classified, the class identifier may be stored with the document.

One or more of the class groups may have a default class. For example, the default class may be a null class. Thus, if the classifier does not classify the input document according to a particular class group (e.g., because the class group is irrelevant), the input document may be deemed classified into the null class regardless of whether any class identifier is actually stored.

The combination of classes assigned to the document forms the classification of the input document. Namely, the classification of the document is a set of classes in the various class groups that is assigned to the document.

In one or more embodiments, the classification has a corresponding set of target fields (e.g., set of target fields X (108), target Y fields (110)). The set of target fields define the information to extract from the input document. The set of target fields are the fields that should be populated with values from the input document that should be extracted from the input document based on the classification of the input document. Namely, each target field specifies a corresponding type of value to extract from the document. The set of target fields is specific to the classification. Different classifications may have overlapping sets of target fields. For example, if the classification identifies the document as a change rate document, the target field may be the new rate field and the value extracted may be a specific rate value (e.g., "10%").

Continuing with FIG. 1, the extraction computing system (102) includes a document input interface (124). The document input interface (124) may be an application programming interface or a graphical user interface that is configured to receive an input document. For example, the document input interface (124) may be an interface through which a user uploads the input document. As another example, the document input interface (124) may be configured to automatically retrieve one or more documents. In one or more embodiments, although not shown in FIG. 1, the document input interface (124) may be connected to an optical character recognition (OCR) engine. The OCR engine is configured to recognize individual characters and text in the document and put bounding boxes around groups of text. For example, the OCR engine may detect the lines of a table and put individual bounding boxes around all of the text in each cell of the input document. Bounding boxes may also be around paragraphs or groups of paragraphs in the input document.

The document input interface (124) is connected to a vector embedding model (126) and a table extractor (134). The vector embedding model (126) is configured to generate a vector embedding of the text in the input document. A vector embedding is a numerical feature vector. In one or more embodiments, the vector embedding model is a syntactic model that generates a syntactic embedding of the input document. The syntactic embedding is different from a semantic embedding in that a syntactic embedding does not consider the overall meaning of the document, but rather considers individual words of the document. By way of an example of a syntactic embedding model, the vector embedding model (126) may be a bag of words model or term frequency-inverse document frequency (tf-idf) model.

The cascading classifier (128) is configured to classify the input document using the multiple class groups using the vector embeddings. In one or more embodiments, the cascading classifier (128) iteratively classifies the input document in class groups according to the order specified by the directed acyclic graph (106). The cascading classifier (128) may be an ensemble of machine learning models, each trained for an individual class group. In one or more embodiments, the cascading classifier (128) is a neural network model that takes the vector embedding as input. In one or more embodiments, the cascading classifier (128) uses vector embeddings to classify various intents of the input document to appropriate labels. The vector embedding is designed in such a way as to accommodate the location information of the text in the image of the input document as well as the text's relative importance concerning the words available among such types of input documents. The vector embedding is learned by optimizing the embedding in such a way that gives the best classification accuracy.

The cascading classifier (128) is connected to a classifier training system (132). The classifier training system (132) is configured to train the classifier. Specifically, the classifier training system is configured to perform two levels of training. In a first level, the classifier training system trains the classifier to classify different training documents according to each class groups. In a second level, the classifier training system (132) is configured to learn the directed acyclic graph while training the classifier. Specifically, the classifier training system (132) is configured to learn which class groups improve classification in other class groups and which class groups are independent of each other. Thus, the classifier training system (132) learns a relationship between class groups.

Returning to the cascading classifier (128), the cascading classifier is connected to a table extractor (134) and a freeform extractor (136). The table extractor (134) is configured to extract values for target fields from tables in the input document. In one or more embodiments, the table extractor (134) is configured to use a projection to extract values. A projection is an area the extends outward from a predefined point on a bounding box. For example, the predefined point may be the centroid of the bounding box. As another example, the predefined point may be a particular point on an edge of the bounding box. Other predefined points may be used without departing from the scope of the invention.

The freeform extractor (136) is configured to extract values from freeform text of the input document. The freeform extractor (136) is configured to use a language model (138) to extract the values. The language model (138)

may be, for example, a large language model as known in the art. The language model may be a third-party language model. In one or more embodiments, the freeform extractor (136) is configured to provide a question and a context to the language model (138). The question is the particular request to the language model (138). The context is background information for the language model (138).

The freeform extractor (136) and the table extractor (134) is connected to an extracted field consumer (140). The extraction field consumer (140) is software that obtains, as input, the field value pairs extracted from the document and produces output. For example, the extraction field consumer (140) may be a user interface that is configured to present information to a user. The extraction field consumer (140) may include one or more templates that is configured to populate a display. The extraction field consumer (140) may be a software application that is configured to combine the field value pairs with other data to generate reports and perform various functionality. The operations of the components of FIG. 1 are described in FIG. 2-FIG. 6 discussed below.

While FIG. 1 shows a configuration of components, other configurations may be used without departing from the scope of the invention. For example, various components may be combined to create a single component. As another example, the functionality performed by a single component may be performed by two or more components. The shown connectivity between components may be direct, indirect, through messages, or shared data.

FIG. 2-FIG. 6 show flowcharts in accordance with one or more embodiments. While the various steps in these flowcharts are presented and described sequentially, at least some of the steps may be executed in different orders, may be combined or omitted, and at least some of the steps may be executed in parallel. Furthermore, the steps may be performed actively or passively.

Figures 2, 3:
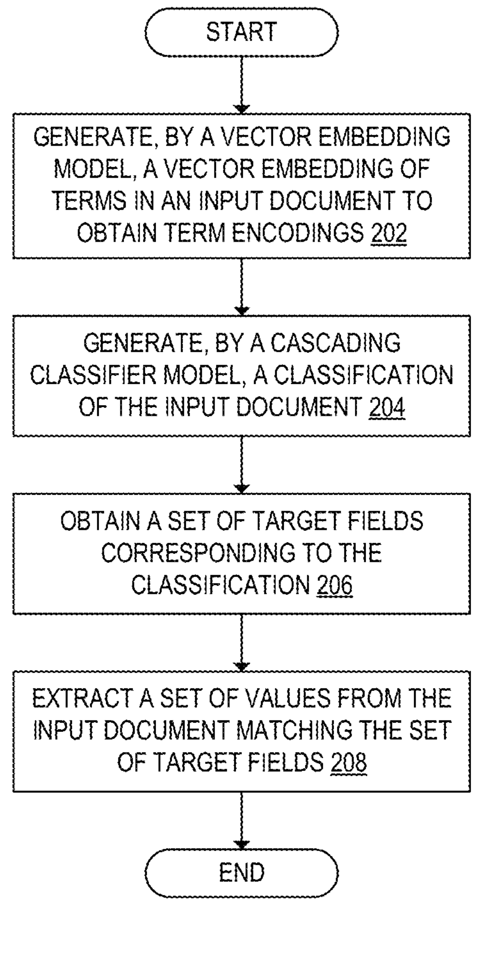
FIG. 2 shows a flowchart for processing an input document in accordance with one or more embodiments.
FIG. 3 shows a flowchart for classifying the input document into one of multiple groups in accordance with one or more embodiments.

FIG. 2 shows a flowchart for processing an input document in accordance with one or more embodiments. In one or more embodiments, an input document is received by the system. The input document may be uploaded, for example, by a user. As another example, the input document may be retrieved from storage. If the image form (i.e., an image formatted file version) of the input document is obtained, then OCR may be performed on the input document to generate text form of the input document. Specifically, the OCR engine may identify characters from groups of pixels. The OCR engine may further identify groups of text and add bounding boxes around groups of text. For example, the bounding boxes may be around text in each cell and in paragraphs. The output of the OCR engine is recognized characters and spaces forming terms of the input document.

In Block 202, a vector embedding model generates a vector embedding of the terms in an input document to obtain term encodings. A vector embedding model operates on the input document to generate a set of term encodings of the input document. Term encodings are numeric vector that are learned through training. In the term encodings, terms that are similar in meaning are similar have similar vectors while terms that are dissimilar have dissimilar vectors. The vector embedding model may be a syntactic model that operates on individual terms rather than overall meaning. The purpose of using a syntactic embedding model is that resulting term encodings are used for classification. Because key terms or similar key terms are likely in the document that would be similar to the classification, a semantic encoding of the overall input document may obfuscate the terms whereas a syntactic model may highlight the terms leading to a better classification. Nevertheless, unless expressly claimed, both syntactic and semantic embedding models are contemplated herein for the vector embedding model.

In Block 204, a cascading classifier model generates a classification of the input document. As discussed above generating a classification assigns a class in each class group to the input document. A default class may be assigned without departing from the scope of the claims. Generating a classification is described in reference to FIG. 3. Turning briefly to FIG. 3, the directed acyclic graph ordering the class groups is traversed. Specifically, in Block 302, the cascading classifier traverses to a next node of the directed acyclic graph ordering the class groups.

When traversing the directed acyclic graph, parent nodes are processed before child nodes. The child nodes are then processed using the class determined for class groups from the parent nodes. For example, one type of traversal that may be used is a breadth first search traversal whereby nodes on the same level are processed before moving to the next level. Other traversal strategies may be used.

In Block 304, using any parent classes identified by the directed acyclic graph and term embeddings, the input document is classified into a first class of a current class group of the current node using the term embeddings. When traversing to a node in the directed acyclic graph, the node is processed. The node being processed is the current node and corresponds to a current class group. Processing the current node classifies the input document into a class of a current class group using the term embeddings of the input document. Namely, the term embeddings are used as features for the classifying for the current class group. If the current node is a child node, the classes determined from the parent class groups corresponding to the parent nodes are also used as features. The features may be concatenated together, and the concatenated features passed to the classifier. The classifier processes the concatenated features to determine a class for the current class group. Thus, the class is added to the classification of the input document.

In Block 306, a determination is made whether another unprocessed node exists in the directed acyclic graph. If another unprocessed node exists, the flow returns to Block 302. If another unprocessed node exists, the flow returns to Block 302. The result of FIG. 3 is a class for each class group assigned to the input document to form a classification.

Returning to FIG. 2, in Block 206, a set of target fields corresponding to the classification is obtained. The classification is mapped, in storage, to a set of target fields. Individual classes may be mapped to target fields, or the classification as a whole may be mapped to the set of target fields. Thus, obtaining the set of target fields may be performed by querying storage with class identifiers.

In Block 208, a set of values from the input document matching the set of target fields is extracted. In one or more embodiments, the extraction is a two-stage extraction process. In a first stage, tabular extraction is performed. Specifically, a first subset of the set of values are extracted by matching bounding boxes around the first subset of values to bounding boxes around a first subset of the set of target fields. The matching process identifies which bounding boxes around values match which bounding boxes that describe the fields. Performing the first stage is described below and in reference to FIG. 4.

After performing the first stage, a second subset of the set of values missing from the first subset of the set of values is identified. Specifically, target fields that have missing corresponding values are identified. Based on the determining, a second stage that includes using a language model to extract the second subset of the set of values from the input document is performed. The second stage involves sending context and questions to a language model. The response of the language is one or more field values.

In one or more embodiments, the extracted target field and values are stored or presented. For example, the extracted field value pairs may be stored in the data repository, in a database associated with the user, etc. Presenting the field value pairs may include populating a user interface with the field values pairs. To perform the presenting, a template matching the classification is obtained. The template may be obtained in a same or similar manner as identifying the set of target fields. The template includes field identifiers of the target fields. Based on the field identifiers, the template is populated with the values to generate a user interface, which is presented. Presenting the user interface may include transmitting the user interface to the user computing system on which the user interface is displayed.

Figure 4:
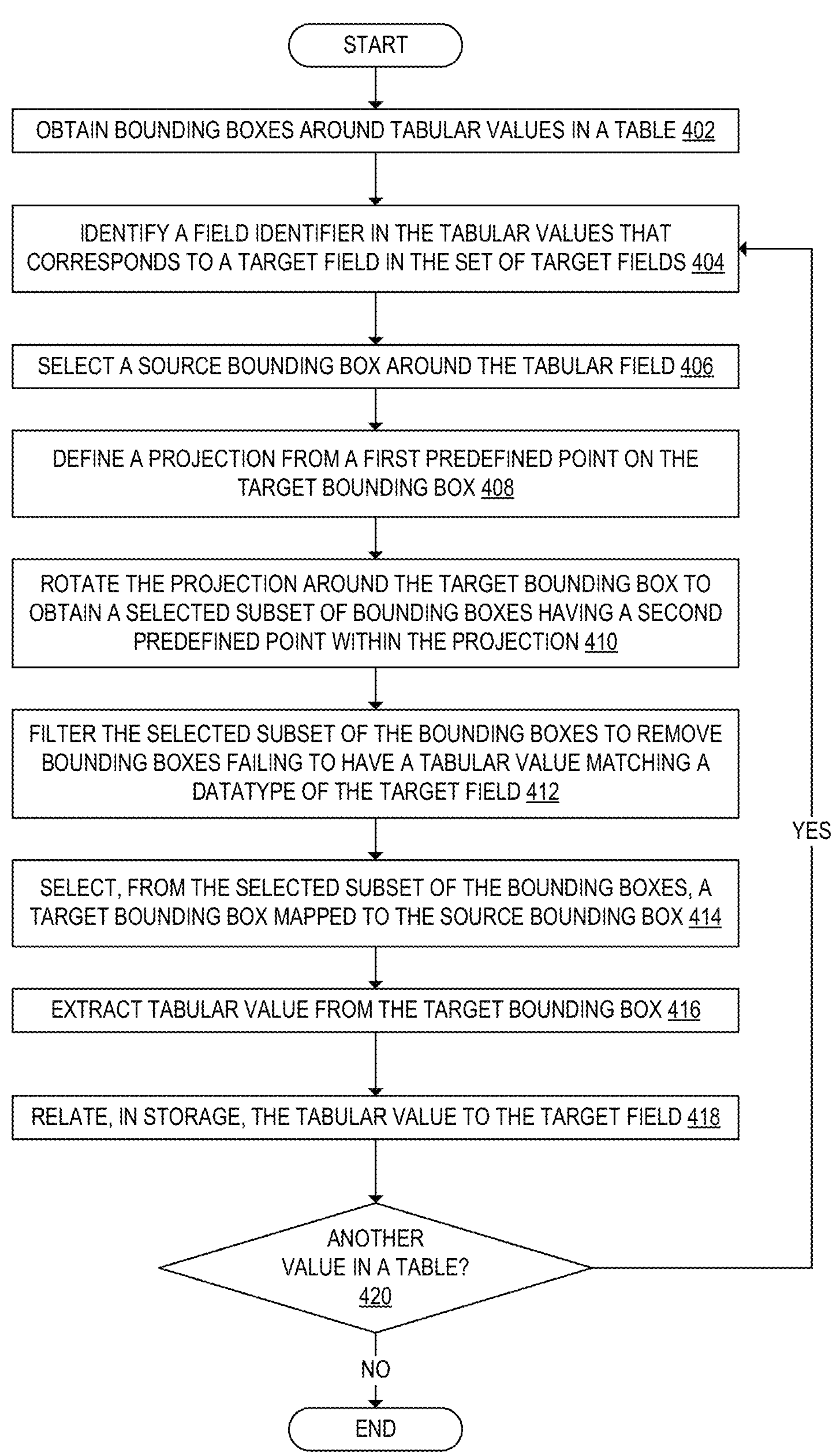
FIG. 4 shows a flowchart for extracting values from a table in accordance with one or more embodiments.

FIG. 4 shows a flowchart for extracting values from a table in accordance with one or more embodiments. The extraction process of FIG. 4 and FIG. 5 may use the text form of the document instead of the output of the vector encoding model.

In Block 402, bounding boxes around tabular values in a table are obtained. The OCR engine outputs bounding boxes around groups of text. From the lines in the document and the particular grouping of bounding boxes, the table is identified.

In Block 404, a field identifier in the tabular values that corresponds to a target field in the set of target fields is identified. Keyword matching based on having identical keywords or synonyms may be used to identify when a tabular value in the table is a field identifier that identifies a target field. For example, the table may be searched for keywords that match (e.g., are synonyms of or the same as) one or more of the target fields. When a match is found, the keyword is identified as a field identifier that matches a target field.

In Block 406, a source bounding box around the tabular field is selected. The bounding box around the keyword is identified as the source bounding box.

In Block 408, a projection from a first predefined point on the target bounding box is defined. The predefined point may be the centroid of the bounding box. In one or more embodiments, the projection is defined by a threshold distance and a threshold angle from the predefined point. The threshold distance and the threshold angle may be preset as a configuration parameter. The threshold angle is an angular distance between a first line that extends outward from the predefined point and a second line the extends outward from the predefined point. The region between the first line and the second line as defined by the threshold angle is the projection.

In Block 410, the projection is rotated around the target bounding box to obtain a selected subset of the bounding boxes having a second predefined point within the projection. Each bounding box in the selected subset have predefined points that are within the projection.

In Block 412, the selected subset of the bounding boxes is filtered to remove bounding boxes failing to have a tabular value matching a datatype of the target field. The target fields have a corresponding datatype. For example, if the target field is name, then the datatype is a String with alphanumeric characters. If the target field is rate, then the corresponding data type may be a decimal or percentage numeric value. The values within the selected subset of the bounding boxes are identified and compared against the datatype of the target field. Any bounding boxes having a datatype that does not match the datatype of the target field is removed or otherwise filtered from the selected subset of bounding boxes.

In Block 414, from the selected subset of the bounding boxes, a target bounding box mapped to the source bounding box is selected. The target bounding box may be selected based on minimum distance from the source bounding box. For example, the bounding box in the selected subset that has the predefined point closest to the predefined point of the source bounding box is selected.

In Block 416, a tabular value from the target bounding box is extracted. The target value is read from the target bounding box. Further, in Block 418, the tabular value is related, in storage, to the target field, wherein the tabular value is in the set of values.

In Block 420, a determination is made whether another value in a table is identified. If another value in any table is identified, the process flows to Block 404 to process the next value. Different orders may be performed to extract tabular values from the table. For example, each table may be scanned to identify each bounding box corresponding to a target field. Then, the process of identifying the field value for the target field may be performed in parallel for each target field.

Figure 5:
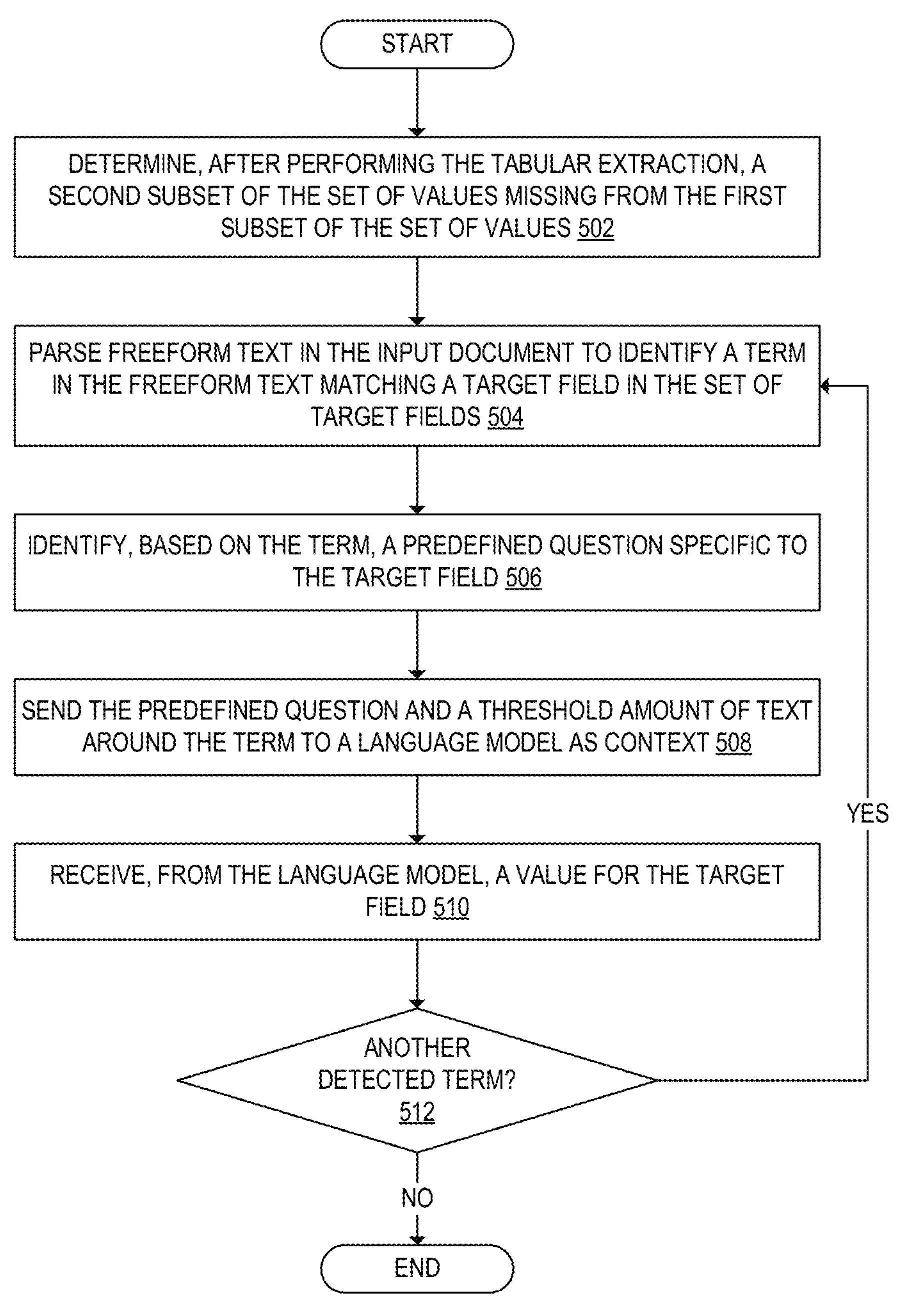
FIG. 5 shows a flowchart for performing freeform text extraction in accordance with one or more embodiments.

A second type of extraction supported by embodiments described herein is freeform text extraction. FIG. 5 shows a flowchart for performing freeform text extraction in accordance with one or more embodiments.

In Block 502, after performing the tabular extraction, a second subset of the set of values missing from the first subset of the set of values is determined. Specifically, a determination is made as to which target fields are missing after performing the tabular extraction.

In Block 504, the input document is parsed to identify a term in the freeform text matching a target field in the set of target fields. Identifying a term in the input document that matches a target field may be performed as discussed in Block 404 of FIG. 4. Specifically, a keyword or similar term matching process may be used.

In Block 506, based on a term, a predefined question specific to the target field is identified. The predefined questions may be related in storage with the target field identifier. As another example, a name of a target field may be populated in a general template for a question. For example, the question may be "Given the various context, what is <target field name>?"

In Block 508, the predefined term is sent with the threshold amount of text around the term to a language model as context. A context is created that includes the text around the term. For example, if the term is found in a paragraph, then the entire paragraph may be used as context. As another example, the sentence before and after the target field may be used as context. The amount of information that is sent as context is configurable.

In Block 510, from the language model, a value for the target field is received. The value is stored in the set of values and related to the target field.

In Block 512, a determination is made whether another detected term exists. Specifically, the freeform text is parsed to identify other field identifiers of target fields, if exist. Once the freeform text is extracted, the freeform text may be used.

Figure 6:
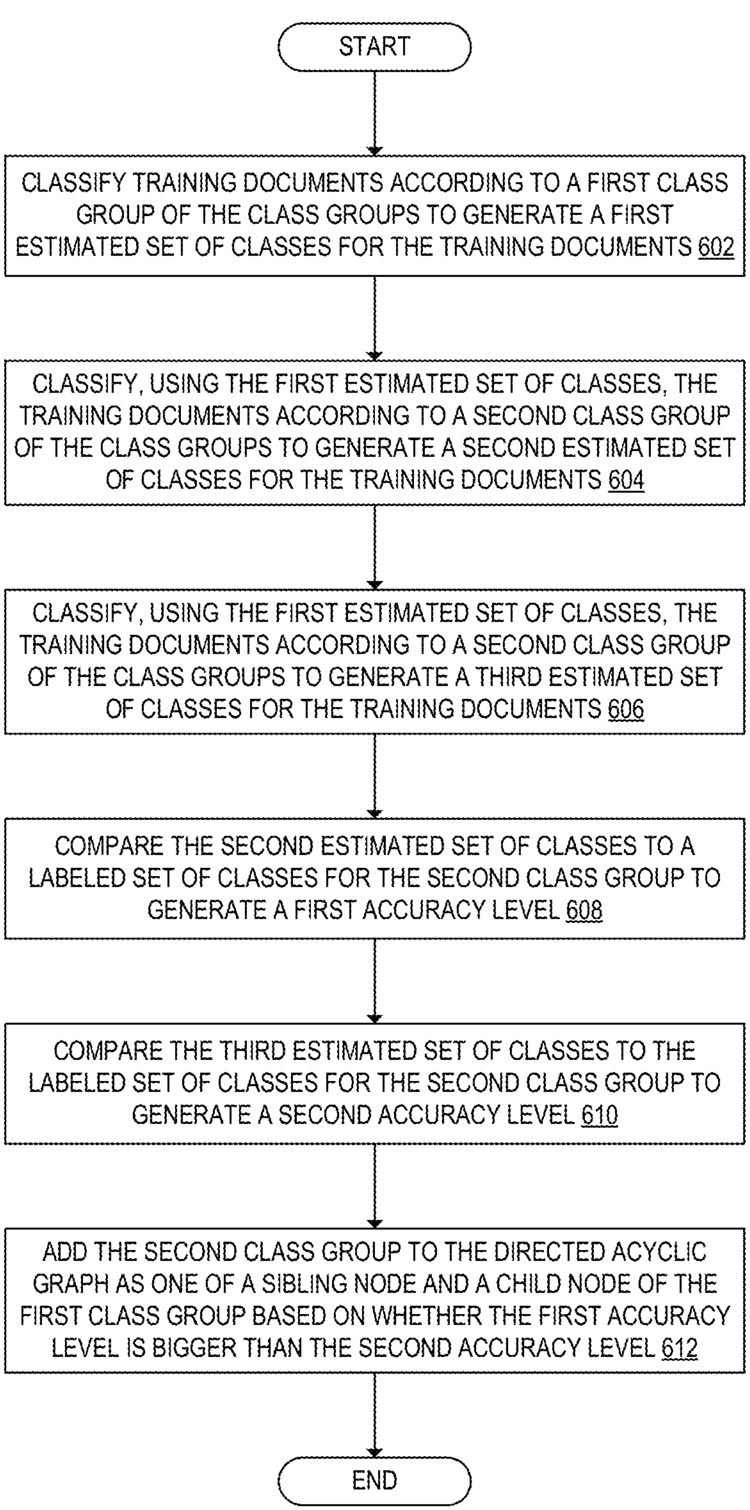
FIG. 6 shows a flowchart for training a cascading classifier in accordance with one or more embodiments.

FIG. 6 shows a flowchart for training a cascading classifier in accordance with one or more embodiments. In general, training the cascading classifier may be performed in a greedy fashion. The class groups may be ordered to generate an order. In one or more embodiments, the initial order may be an estimated order of which class group classifications may improve the class group classifications of other class groups. The class groups are tested using training data to determine various accuracy levels with and without using the parent class groups. Based on the order, the directed acyclic graph is greedily defined according to the accuracy levels. FIG. 6 shows a more detailed example for two class groups.

In Block, 602, training documents are classified according to a first class group to generate a first estimated set of classes for the training documents. A portion of training documents are used to train the classifier to classify the documents according to the first class group. Another portion is used to test the classifier classifying the documents according to the first class group.

In Block 604, using the first estimated set of classes, the training documents are classified according to a second class group to generate a second estimated set of classes for the training documents. A portion of training documents are used to train the classifier to classify the documents according to the second class group without using the first class group. Another portion is used to test the classifier of classifying the documents according to the second class group without using the first class group.

In Block 606, using the first estimated set of classes, the training documents are classified according to the second class group to generate a third estimated set of classes. The portion of training documents are used to train the classifier to classify the documents according to the second class group, but with the first estimated set of classes as respective features. Another portion is used to test the classifier classifying the documents according to the second class group without using the respective first estimated set of classes.

In Block 608, the second estimated set of classes are compared to a labeled set of classes for the second class group to generate a first accuracy level. The accuracy level indicates how accurate the classifier is not using the first class group.

In Block 610, the third estimated set of classes are compared to the labeled set of classes for the second class group to generate a second accuracy level. The accuracy level indicates how accurate the classifier is using the first class group.

In Block 612, the second class group is added to the directed acyclic graph as one of a sibling node and a child node of the first class group based on whether the first accuracy level is bigger than the second accuracy level. If the first accuracy level is bigger than the second accuracy level, then the second class group may be added as a sibling node of the first class group in the directed acyclic graph. If the second accuracy level is bigger than the first accuracy level, then the second class group may be added as a child node of the first class group in the directed acyclic graph. The process may be repeated to determine which classifications for which class group improves accuracy of classifying in other class groups. The result is a trained directed acyclic graph that is automatically generated by the computer.

The following examples are for explanatory purposes only and not intended to limit the scope of the invention. FIG. 7 shows a diagram of an input document (702). Input documents similar to the one shown may be received by users who may not understand the document. The users may upload the documents to the extraction computing system. The extraction computing system may have very little a priori knowledge of the input documents. For example, the extraction computing system may only have that the documents are financial documents. However, the extraction computing system has class groups (704) defined that include the jurisdiction, subtype, form numbers, tax types, etc. to classify the document. Within each class group are several classes (706). A classification of an input document is in a class of each class group.

Once the classification is known, target fields (708) may be identified. The target fields identify the type of data to extract from the document according to the classification. Based on the target fields, values (710) are extracted from the document. Examples of value extraction is shown in FIG. 8 and FIG. 9.

Figure 8:
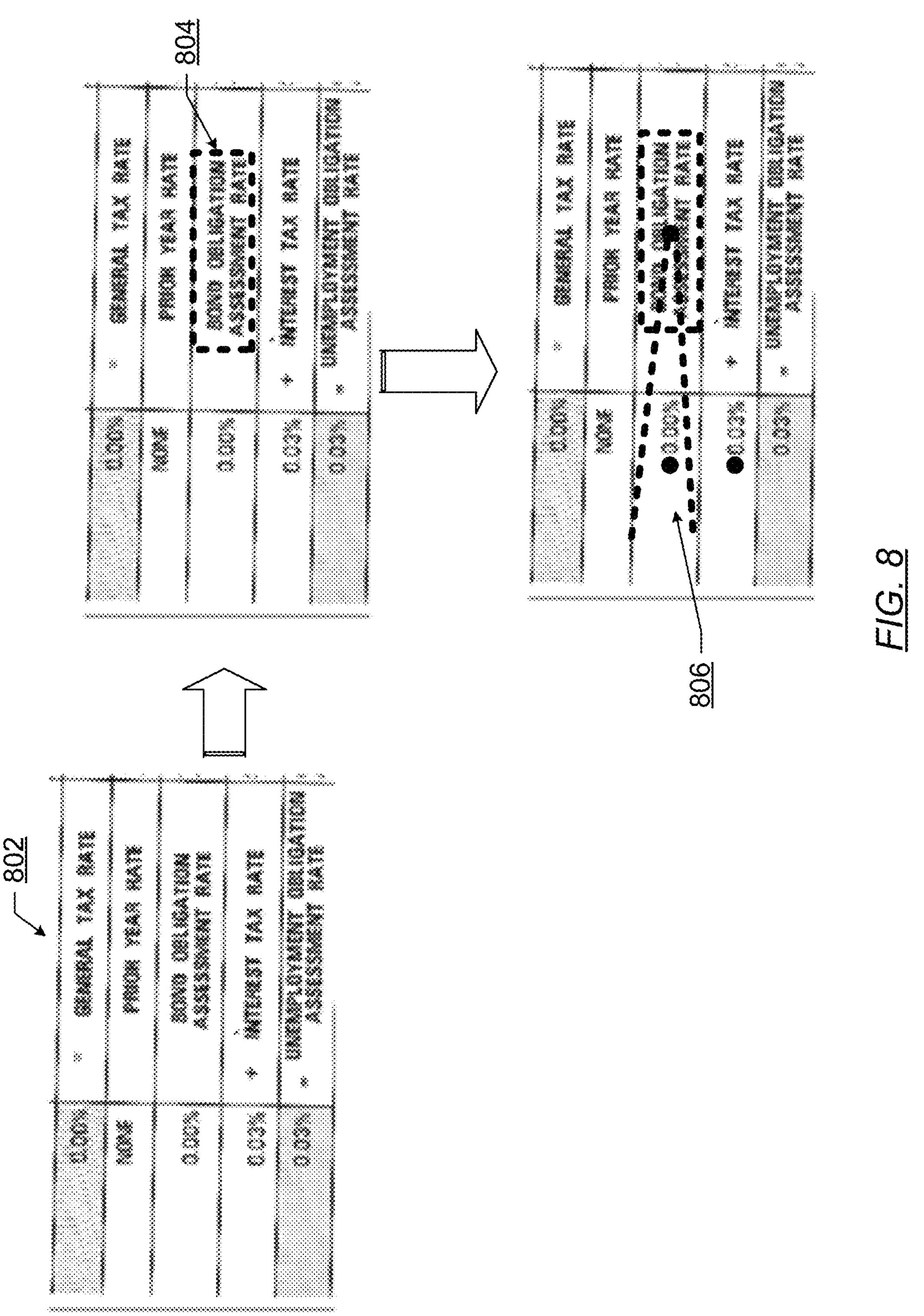
FIG. 8 shows an example of tabular extraction in accordance with one or more embodiments.

FIG. 8 shows an example of extracting a value from a table in accordance with one or more embodiments. Scanned table (802) shows an original scanned image. From the original scanned image, bounding boxes are identified. One of the bounding boxes is "Bond Obligation Assessment Rate", which corresponds to a target field for the classification of the document. Thus, "Bond Obligation Assessment Rate" is the source bounding box. Next, the value corresponding to the bounding box is determined. To determine which bounding box is related in the table to the source bounding box, a projection (806) is defined. The projection is rotated 360 degrees from the centroid of the source bounding box. From the projection, bounding boxes around "0.00%", "None", "Prior Year Rate", "+Interest Tax Rate", and 0.03% are used as the subset of the bounding boxes for being within the projection. "Prior Year Rate", and "+Interest Tax Rate" bounding boxes are filtered out because a "rate" is a numeric value. Notably, "none" may be recognized as a zero rate and have alternative values. Because the centroid of "0.00%" bounding box has the minimum distance to the centroid of the source bounding box, "0.00%" bounding box selected. The value of "0.00%" is related in storage to the target field for "Bond Obligation Assessment Rate". As shown in the example, even though the value is to the left of the field identifier, the value is still able to be related to the field identifier using the extraction technique.

FIG. 9 shows an example of freeform extraction in accordance with one or more embodiments. In the example, the notice is paragraph form. The terms of the notice are scanned to identify the term "period". Because "period" is associated with a target field, as shown in block (904) the context surrounding the word "period" is extracted and includes " . . . employees for the period beginning Jul. 1, 2020 and ending Jun. 30, 2021." Further, the question is added, "What is the start date of the period?" The question and context are sent to a language model that responds with "Jul. 1, 2020". Thus, "Jul. 1, 2020" may be associated with the start date of the period in storage. By only sending a portion of the original document as the context, bandwidth and response time may be improved.

As shown in the examples, one or more embodiments may receive and classify virtually any document into multiple classes. Based on the classification, field values are extracted from both tables and freeform text, regardless of the layout or arrangement of the field values.

Figure 10A:
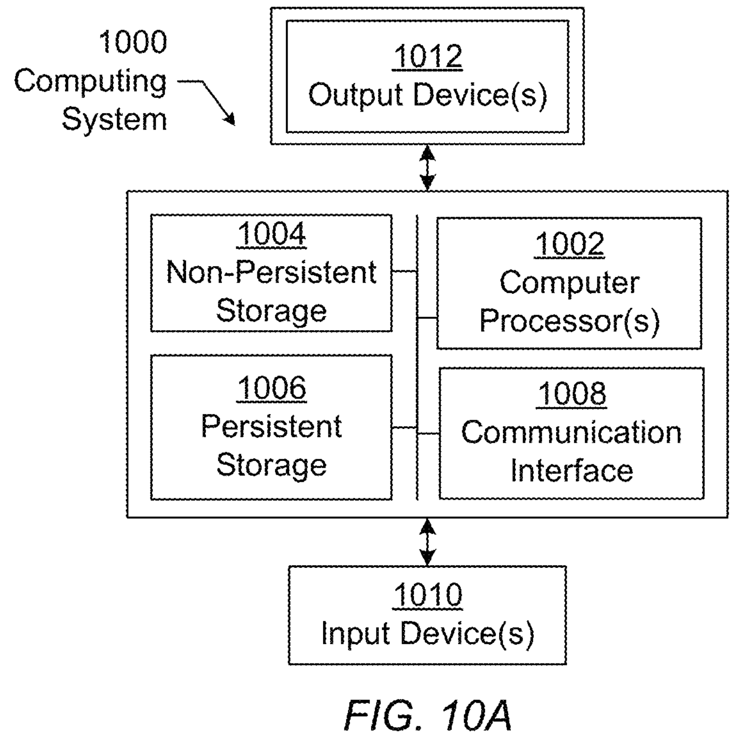
FIGS. 10A and 10B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10A, the computing system (1000) may include one or more computer processors (1002), non-persistent storage (1004), persistent storage (1006), a communication interface (1008) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) may be one or more cores or micro-cores of a processor. The computer processor(s) (1002) includes one or more processors. The one or more processors may include a central processing unit (CPU), a graphics processing unit (GPU), a tensor processing units (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1012). The inputs may include text input, audio input, video input, etc., which may be processed and transmitted by the computing system (1000) in accordance with the disclosure. The communication interface (1008) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the output devices (1012) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1012) may display data and messages that are transmitted and received by the computing system (1000). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 10B:
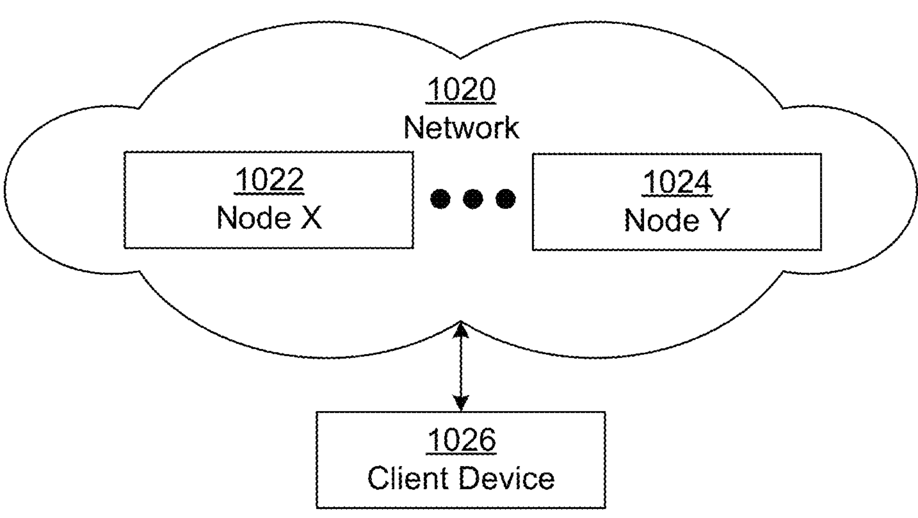

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include and/or perform all or a portion of one or more embodiments.

The computing system of FIG. 10A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

generating, by a vector embedding model, a vector embedding of a plurality of terms in an input document to obtain a plurality of term encodings;

generating, by a cascading classifier model, a classification of the input document, wherein generating the classification comprises iteratively:

traversing a directed acyclic graph ordering a plurality of class groups, and while traversing the directed acyclic graph, classifying the input document into a first class of a current class group of the plurality of class groups using the plurality of term encodings, wherein classifying the input document into the first class uses at least one second class of at least one parent class group of the plurality of class groups, and wherein the classification comprises the first class and the at least one second class;

obtaining a set of target fields corresponding to the classification; and extracting a set of values from the input document matching the set of target fields.

2. The method of claim 1, further comprising:

obtaining a plurality of bounding boxes around a plurality of tabular values in a table;

identifying a field identifier in the plurality of tabular values that corresponds to a target field in the set of target fields;

selecting a source bounding box of the plurality of bounding boxes around the target field;

defining a projection from a first predefined point on the target bounding box;

rotating the projection around the target bounding box to obtain a selected subset of the plurality of bounding boxes having a second predefined point within the projection;

selecting, from the selected subset of the plurality of bounding boxes, a target bounding box mapped to the source bounding box;

extracting tabular value from the target bounding box; and relating, in storage, the tabular value to the target field, wherein the tabular value is in the set of values.

3. The method of claim 2, wherein the first predefined point and the second predefined point are centroids of respective bounding boxes.

4. The method of claim 2, further comprising:

filtering the selected subset of the plurality of bounding boxes to remove bounding boxes failing to have a tabular value matching a datatype of the target field, wherein the tabular value is in the plurality of tabular values.

5. The method of claim 2, wherein the target bounding box is selected based on having a lowest distance amongst the selected subset of the plurality of bounding boxes.

6. The method of claim 2, wherein the projection is defined by a threshold distance and a threshold angle.

7. The method of claim 1, further comprising:

parsing freeform text in the input document to identify a term in the freeform text matching a target field in the set of target fields;

sending a threshold amount of text around the term to a language model as context;

receiving, from the language model, a value for the target field; and storing the value in the set of values and related to the target field.

8. The method of claim 7, further comprising:

identifying, based on the term, a predefined question specific to the target field; and sending the predefined question to the language model, wherein the value is transmitted responsive to the predefined question.

9. The method of claim 1, wherein extracting the set of values comprises:

extracting, in a first stage, a first subset of the set of values by matching bounding boxes around the first subset of values to bounding boxes around a first subset of the set of target fields;

determining, after performing the first stage, a second subset of the set of values missing from the first subset of the set of values; and based on the determining, performing a second stage comprises using a language model to extract the second subset of the set of values from the input document.

10. The method of claim 1, further comprising:

classifying a plurality of training documents according to a first class group of the plurality of class groups to generate a first estimated set of classes for the plurality of training documents;

classifying, using the first estimated set of classes, the plurality of training documents according to a second class group of the plurality of class groups to generate a second estimated set of classes for the plurality of training documents;

classifying, using the first estimated set of classes, the plurality of training documents according to the second class group of the plurality of class groups to generate a third estimated set of classes for the plurality of training documents;

comparing the second estimated set of classes to a labeled set of classes for the second class group to generate a first accuracy level;

comparing the third estimated set of classes to the labeled set of classes for the second class group to generate a second accuracy level; and adding the second class group to the directed acyclic graph as one of a sibling node and a child node of the first class group based on whether the first accuracy level is bigger than the second accuracy level.

11. The method of claim 10, further comprising:

ordering the plurality of class groups to generate an order;

testing the plurality of class groups according to the order to generate a plurality of accuracy levels of the plurality of class groups; and greedily defining the directed acyclic graph according to the plurality of accuracy levels.

12. The method of claim 1, further comprising:

identifying a template matching the classification;

populating the template with the set of values to generate a user interface; and presenting the user interface.

13. The method of claim 1, further comprising:

obtain an image form of the input document; and performing an optical character recognition (OCR) of the input document to generate a text form of the input document comprising the plurality of terms.

14. The method of claim 1, wherein the vector embedding is a syntactic embedding of a plurality of terms in the input document.

15. A system comprising:

one or more computer processors; and storage comprising instructions for causing the one or more computer processors to perform operations comprising:

generating, by a vector embedding model, a vector embedding of a plurality of terms in an input document to obtain a plurality of term encodings, generating, by a cascading classifier model, a classification of the input document, wherein generating the classification comprises iteratively:

traversing a directed acyclic graph ordering a plurality of class groups, and while traversing the directed acyclic graph, classifying the input document into a first class of a current class group of the plurality of class groups using the plurality of term encodings, wherein classifying the input document into the first class uses at least one second class of at least one parent class group of the plurality of class groups, and wherein the classification comprises the first class and the at least one second class, obtaining a set of target fields corresponding to the classification, and extracting a set of values from the input document matching the set of target fields.

16. The system of claim 15, wherein the operations further comprise:

obtaining a plurality of bounding boxes around a plurality of tabular values in a table;

identifying a field identifier in the plurality of tabular values that corresponds to a target field in the set of target fields;

selecting a source bounding box of the plurality of bounding boxes around the target field;

defining a projection from a first predefined point on the target bounding box;

rotating the projection around the target bounding box to obtain a selected subset of the plurality of bounding boxes having a second predefined point within the projection;

selecting, from the selected subset of the plurality of bounding boxes, a target bounding box mapped to the source bounding box;

extracting tabular value from the target bounding box; and relating, in storage, the tabular value to the target field, wherein the tabular value is in the set of values.

17. The system of claim 16, wherein the first predefined point and the second predefined point are centroids of respective bounding boxes.

18. The system of claim 16, wherein the operations further comprises:

filtering the selected subset of the plurality of bounding boxes to remove bounding boxes failing to have a tabular value matching a datatype of the target field, wherein the tabular value is in the plurality of tabular values.

19. A method comprising:

classifying a plurality of training documents according to a first class group of a plurality of class groups to generate a first estimated set of classes for the plurality of training documents;

classifying, using the first estimated set of classes, the plurality of training documents according to a second class group of the plurality of class groups to generate a second estimated set of classes for the plurality of training documents;

classifying, using the first estimated set of classes, the plurality of training documents according to a second class group of the plurality of class groups to generate a third estimated set of classes for the plurality of training documents;

comparing the second estimated set of classes to a labeled set of classes for the second class group to generate a first accuracy level;

comparing the third estimated set of classes to the labeled set of classes for the second class group to generate a second accuracy level; and adding the second class group to a directed acyclic graph as one of a sibling node and a child node of the first class group based on whether the first accuracy level is bigger than the second accuracy level.

20. The method of claim 19, further comprising:

ordering the plurality of class groups to generate an order;

testing the plurality of class groups according to the order to generate a plurality of accuracy levels of the plurality of class groups; and greedily defining the directed acyclic graph according to the plurality of accuracy levels.

* * * * *